United States Patent [19]

Faigle et al.

[11] Patent Number: 5,478,109
[45] Date of Patent: Dec. 26, 1995

[54] INFLATOR ASSEMBLY

[75] Inventors: Ernst M. Faigle, Imlay City; Tracy S. Sparks, Lapeer; Richard J. Thompson, Imlay City, all of Mich.

[73] Assignee: TRW Vehicle Safety Systems, Inc., Lyndhurst, Ohio

[21] Appl. No.: 327,879

[22] Filed: Oct. 24, 1994

Related U.S. Application Data

[63] Continuation-in-part of Ser. No. 146,967, Nov. 2, 1993, Pat. No. 5,390,954, which is a continuation-in-part of Ser. No. 24,851, Feb. 26, 1993, which is a continuation of Ser. No. 719,322, Jun. 21, 1991, abandoned.

[51] Int. Cl.$^6$ .................................................. B60R 21/16
[52] U.S. Cl. .................................... 280/736; 280/742
[58] Field of Search ........................... 280/736, 740, 280/741, 742

[56]         References Cited

U.S. PATENT DOCUMENTS

| | | | |
|---|---|---|---|
| 3,354,012 | 11/1967 | Forman et al. | 156/69 |
| 3,791,669 | 2/1974 | Hamilton | 280/738 |
| 3,904,221 | 9/1975 | Shiki et al. | 280/736 |
| 3,931,019 | 1/1976 | Fowler | 210/485 |
| 3,938,826 | 2/1976 | Giorgini et al. | 280/738 |
| 4,012,211 | 3/1977 | Goetz | 55/485 |
| 4,289,510 | 9/1981 | Herndon, Jr. | 55/294 |
| 4,322,385 | 3/1982 | Goetz | 422/165 |
| 4,402,830 | 9/1983 | Pall | 210/457 |
| 4,652,285 | 3/1987 | Greene | 55/498 |
| 4,817,828 | 4/1989 | Goetz | 222/3 |
| 4,858,951 | 8/1989 | Lenzen | 280/741 |
| 4,878,690 | 11/1989 | Cunningham | 280/741 |
| 5,028,070 | 7/1991 | Bender | 280/741 |
| 5,137,696 | 8/1992 | Hitachi et al. | 422/180 |
| 5,248,162 | 9/1993 | Levosinski et al. | 280/740 |

FOREIGN PATENT DOCUMENTS 3151001  6/1991  Japan .

OTHER PUBLICATIONS

"Gelman Guide to Ultrafine Process Filtration", The Gelman Instrument Company GEL–3708, Mar. 1970, 12 pages.

*Primary Examiner*—Kenneth R. Rice
*Attorney, Agent, or Firm*—Tarolli, Sundheim & Covell

[57]              ABSTRACT

An apparatus (10) for inflating an inflatable vehicle occupant restraint (12) includes a cylindrical inflator (800) containing an ignitable gas generating material (816) which, when ignited, generates gas for inflating the restraint (12). The inflator (800) has a tubular part (802) with a longitudinal central axis (808) and axially opposite ends (856) and (858). The tubular part (802) defines a combustion chamber (812) containing the gas generating material (816), and includes a cylindrical filter (842) for filtering the gas radially outward of the combustion chamber (812). The inflator (800) is free of a tubular outer body wall. The inflator (800) further includes a pair of end caps (804, 806) extending across the ends (856, 858) of the tubular part (802). Fasteners (860, 862) secure the end caps (804, 806) against movement from the tubular part (802) under the influence of the pressure of the gas, and directly engage the tubular part (802) to connect the end caps (804, 806) directly to the tubular part (802).

8 Claims, 7 Drawing Sheets

INFLATOR ASSEMBLY

RELATED APPLICATIONS

The present application is a continuation-in-part of application Ser. No. 146,967, filed Nov. 2, 1993, now U.S. Pat. No. 5,390,957, which is a continuation-in-part of application Ser. No. 024,851, filed Feb. 26, 1993, which in turn is a continuation of application Ser. No. 719,322, filed Jun. 21, 1991, now abandoned.

FIELD OF THE INVENTION

The present invention relates to an apparatus including an inflatable vehicle occupant restraint, such as an air bag, and particularly relates to an inflator for inflating the restraint.

BACKGROUND OF THE INVENTION

U.S. Pat. No. 4,817,828 discloses an apparatus including an inflatable air bag for restraining a vehicle occupant. The apparatus also includes an inflator for inflating the air beg. The inflator has a cylindrical housing containing an ignitable gas generating material which, when ignited, generates gas for inflating the air bag.

The housing has a tubular inner body wall and a tubular outer body wall. The inner body wall defines a cylindrical combustion chamber in which the gas generating material is contained, and has gas flow openings for directing the gas to flow outward from the combustion chamber. The housing also contains a tubular filter which extends circumferentially around the inner body wall. The outer body wall surrounds the filter, and has gas flow openings for directing the gas to flow outward from the inflator. A pair of circular end walls close the axially opposite ends of the inflator, and are held in place by swaged end portions of the outer body wall.

When the inflator disclosed in the '828 patent is actuated, the gas generating material is ignited and rapidly generates the gas for inflating the air bag. The gas flows radially outward from the combustion chamber through the gas flow openings in the inner body wall and into the surrounding filter. The gas is filtered as it flows radially through the filter. It then flows radially outward toward the air bag through the gas flow openings in the outer body wall.

When the gas flows through the inflator in the foregoing manner, it flows from the filter to the outer body wall around the entire inner circumference of the outer body wall. However, the gas flow openings in the outer body wall extend over limited portions of the circumference of the outer body wall. The outer body wall thus has major portions which extend circumferentially between the gas flow openings and which block the gas from flowing radially outward from the inflator other than at the locations of the gas flow openings. As a result, the outer body wall cools the gas, and contains the gas under pressure, as the gas flows against and around the outer body wall before it flows outward from the inflator. Moreover, since the gas flows outward from the inflator only at the locations of the gas flow openings in the outer body wall, the flow of gas moving outward through the filter tends to concentrate in the portions of the filter that are adjacent to the gas flow openings in the outer body wall.

SUMMARY OF THE INVENTION

In accordance with the present invention, an apparatus for inflating an inflatable vehicle occupant restraint comprises a cylindrical inflator containing an ignitable gas generating material. The gas generating material, when ignited, generates gas for inflating the restraint. The inflator has a tubular part with a longitudinal central axis and first and second axially opposite ends. The tubular part of the inflator includes means for defining a combustion chamber containing the gas generating material. The tubular part of the inflator further includes a cylindrical filter means for filtering the gas radially outward of the combustion chamber. The inflator is free of a tubular body wall defining gas flow openings at a location radially outward of the means for defining a combustion chamber.

In accordance with a specific feature of the present invention, the inflator further includes first and second end caps that extend across the first and second ends of the tubular part, respectively. The first and second end caps have fastener means that secure the end caps against movement from the tubular part under the influence of the pressure of the gas. The fastener means directly engages the tubular part to connect the end caps directly to the tubular part.

Since an inflator constructed in accordance with the present invention does not have a tubular outer body wall with gas flow openings, i.e., an outer body wall of any cross sectional shape extending around the axis of the inflator and having gas flow openings, the weight of the inflator is minimized. Also, since the inflator does not have a tubular outer body wall, it does not have outer body wall portions that cool the gas as the gas flows against and around the outer body wall toward gas flow openings. Therefore, the gas retains a relatively greater amount of heat, and thus pressure, as the gas flows through the inflator toward the air bag. As a result, a relatively lesser quantity of the gas generating material is required to inflate the air bag in comparison with prior art inflators which have tubular outer body walls. An inflator constructed in accordance with the present invention also uses the filter more efficiently, because the inflator does not have a tubular outer body wall which would cause the gas to become concentrated in portions of the filter adjacent to the gas flow openings in the outer body wall.

Additionally, an inflator having fastener means in accordance with the present invention does not need an axially extending connector shaft or the like to secure the end caps in place by connecting them directly to each other, because the fastener means secures the end caps in place by connecting them directly to the tubular part of the inflator. Such a connector shaft could take up space within the combustion chamber in the tubular part, whereas the entire volume of the combustion chamber is available for the gas generating material in accordance with this feature of the present invention.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
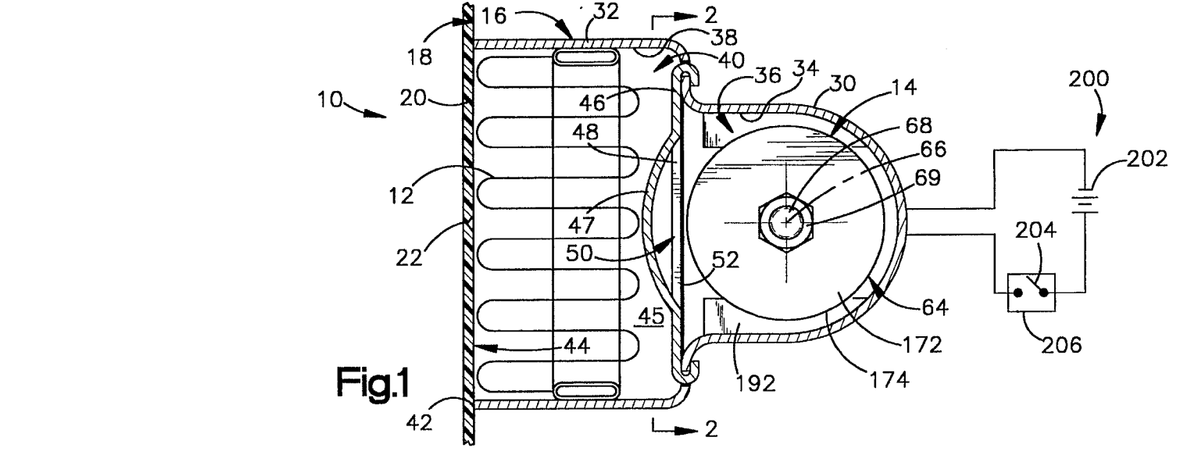
FIG. 1 is a schematic view of a vehicle occupant restraint apparatus comprising a first embodiment of the present invention.

A vehicle occupant restraint apparatus 10 comprising a first embodiment of the present invention is shown in FIG. 1. The apparatus 10 includes an inflatable air bag 12 and an inflator 14. When the inflator 14 is actuated, it rapidly emits a large volume of gas for inflating the air bag 12. The air bag 12 and the inflator 14 are housed in a reaction canister structure 16 which is mounted in a vehicle, such as in the dashboard or instrument panel 18 of the vehicle. The instrument panel 18 has a deployment door 20 with a rupturable section 22.

When the vehicle experiences a predetermined amount of vehicle deceleration, such as occurs in a collision, the inflator 14 is actuated. The gas which is then emitted from the inflator 14 flows into the air bag 12 to inflate the air bag 12. As the air bag 12 begins to inflate, it moves forcefully against the deployment door 20 and breaks deployment door 20 at the rupturable section 22. As the air bag 12 continues to inflate, it moves outward past the deployment door 20 and into the space between an occupant of the vehicle and the instrument panel 18 to restrain movement of the occupant.

Figure 2:
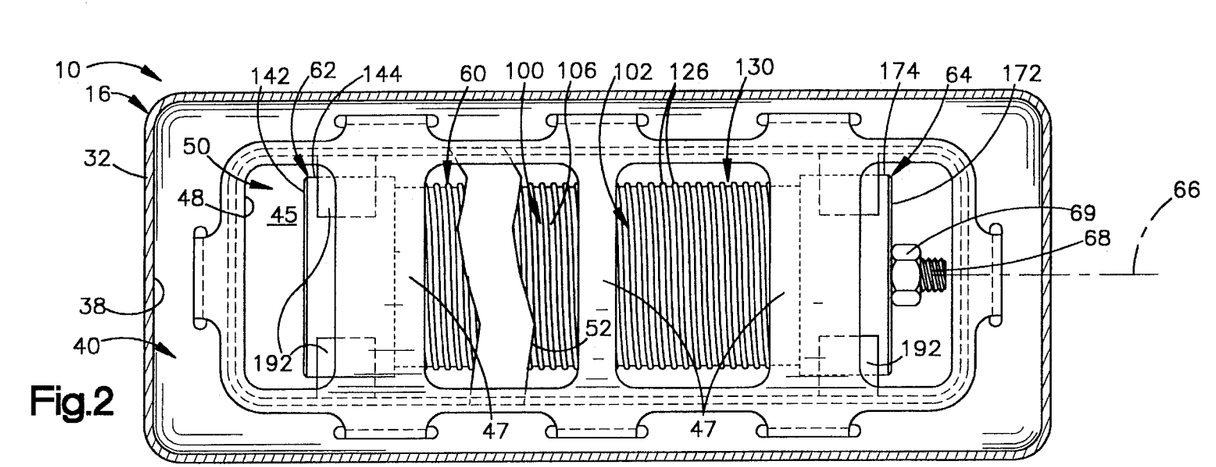
FIG. 2 is a view taken on line 2—2 of FIG. 1.

As further shown in FIGS. 1 and 2, the reaction canister structure 16 has an inner housing wall portion 30 and an outer housing wall portion 32. The inner housing wall portion 30 has an inner surface 34 defining a generally cylindrical inner compartment 36 in which the inflator 14 is located. The outer housing wall portion 32 has an inner surface 38 defining a generally rectangular outer compartment 40 in which the air bag 12 is located. An outer edge surface 42 of the outer housing wall portion 32 defines a deployment opening 44 which is closed by the deployment door 20. The reaction canister structure 16 and the deployment door 20 thus define an enclosed gas flow space 45. The gas flow space 45 comprises a gas flow path extending from the inflator 14 in the inner compartment 36 to the air bag 12 in the outer compartment 40.

The reaction canister structure 16 further includes a retainer plate 46 which extends across the gas flow space 45 between the inner compartment 36 and the outer compartment 40. The retainer plate 46 has outwardly bulging portions 47 which maintain a desired spacing between the air bag 12 and the inflator 14. A plurality of inner edge surfaces 48 of the retainer plate 46 define openings 50 extending through the retainer plate 46. The gas flow path extending from the inflator 14 to the air bag 12 extends through the openings 50 in the retainer plate 46.

An optional sheet 52 of hermetic sealing material is preferably included in the reaction canister structure 16 to seal the inner compartment 36 from moisture. The sealing sheet 52 is formed of metal foil, plastic, aluminized mylar, or any other material that is suitable for providing a hermetic seal, and extends over the openings 50 in the retainer plate 46. The sealing sheet 52 is rupturable by the gas emitted from the inflator 14 to permit the gas to flow freely outward through the openings 50 toward the air bag 12 when the inflator 14 is actuated. Alternatively, the sealing sheet 52 could be omitted from the reaction canister structure 16.

Figure 3:
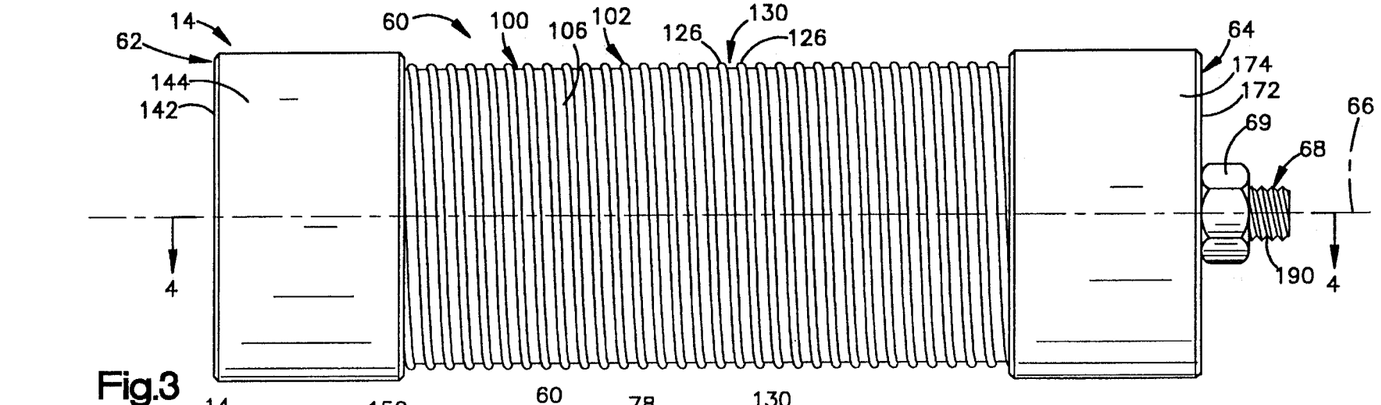
FIG. 3 is an enlarged view of a part of the apparatus of FIG. 1.
Figure 4:
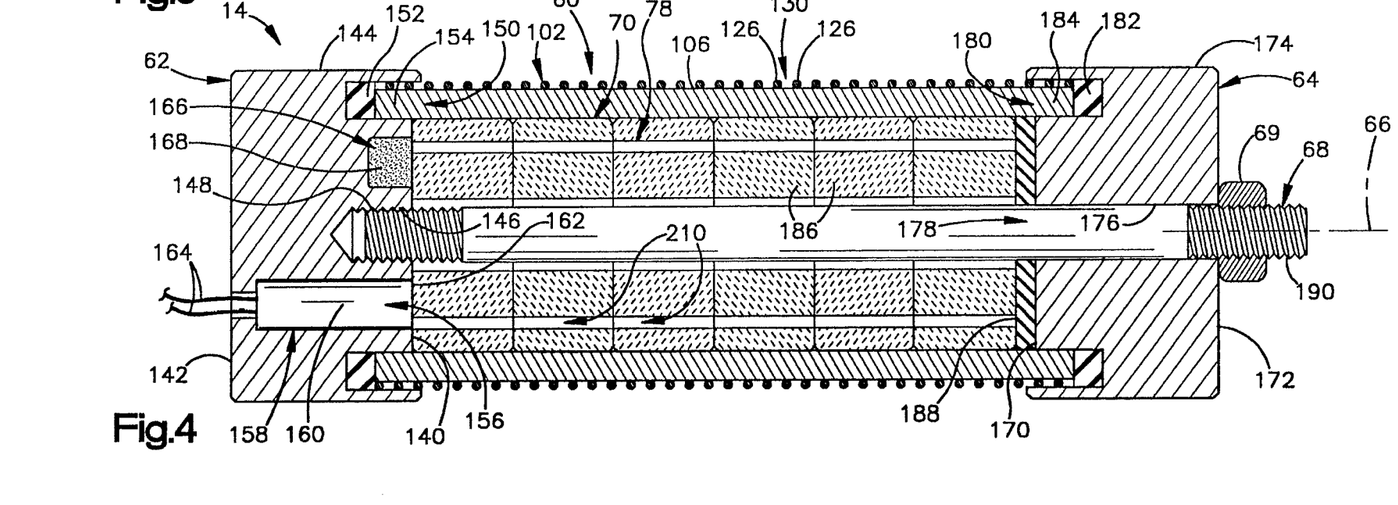
FIG. 4 is a view taken on line 4—4 of FIG. 3.
Figure 5:
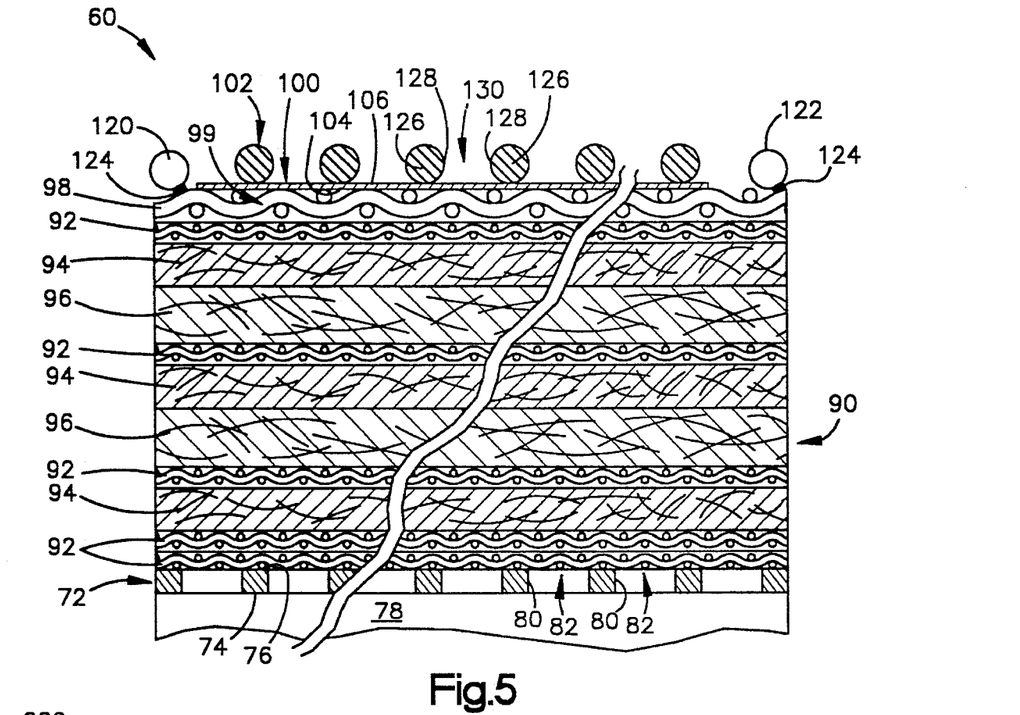
FIG. 5 is an enlarged partial sectional view of parts shown in FIGS. 3 and 4.

The inflator 14 is shown more fully in FIGS. 3–5. The inflator 14 has a generally cylindrical shape defined by a tubular part 60, a first end cap 62, and a second end cap 64, each of which is centered on the longitudinal central axis 66 of the inflator 14. A threaded shaft 68 and a nut 69 secure the tubular part 60 and the end caps 62 and 64 together. An ignitable gas generating material 70, which may have any suitable composition known in the art, is contained within the tubular part 60.

As shown in enlarged detail in FIG. 5, the tubular part 60 of the inflator 14 has a tubular inner body wall 72. The inner body wall 72 has a cylindrical inner surface 74 and a cylindrical outer surface 76. The inner surface 74 defines a cylindrical combustion chamber 78 in which the gas generating material 70 is contained (FIG. 4). The inner body wall 72 further has a plurality of cylindrical inner edge surfaces 80, each of which defines a gas flow opening 82 extending radially through the inner body wall 72. The inner body wall 72 is preferably formed by perforating a sheet of metal to form the openings 82, and by welding the opposite longitudinal edges of the sheet together to form a cylindrical tube.

As further shown in FIG. 5, a generally cylindrical tubular filter 90 extends circumferentially around the inner body wall 72. The filter 90 has a plurality of generally cylindrical filter layers, including layers 92 of wire mesh screen, layers 94 of steel wool, and layers 96 of ceramic/glass wool. The layers 92–96 are formed by laying out flat, flexible sheets of steel wool and ceramic/glass wool in overlying relationship with a flat, flexible sheet of wire mesh screen, and by winding the overlying sheets around the inner body wall 72.

In the first embodiment of the present invention shown in the drawings, the filter 90 further includes an optional outer layer 98 of wire mesh screen. The outer layer 98 is formed by wrapping another sheet of wire mesh screen around the other layers 92–96, and by welding the outer layer 98 to the adjacent layer 92 of wire mesh screen. The wire mesh screen of the outer layer 98 has openings that are larger than the openings in any of the underlying layers 92 of wire mesh screen. A plenum 99 is thus defined by the space between the interwoven screen wires which form the outer layer 98. Alternatively, the outer layer 98 could be omitted from the filter 90.

The tubular part 60 of the inflator 14 further includes a sheet 100 of rupturable pressure controlling material and a support member 102. The sheet 100, which is in the preferred embodiment is formed of aluminum foil, extends circumferentially and axially over the filter 90. The sheet 100 thus has a cylindrical inner surface 104 facing radially inward, and a cylindrical outer surface 106 facing radially outward.

The support member 102 is a strand of metal wire which also extends circumferentially and axially over the filter 90. More specifically, the support member 102 has opposite ends 120 and 122, which are fixed to the outermost filter layer 98 by welds 124, and extends over the foil sheet 100 between the opposite ends 120 and 122 in a helical configuration. The support member 102 thus has a plurality of successive sections 126 shaped as helical turns extending over the outer surface 106 of the foil sheet 100 circumferentially entirely around the axis 66. The helical sections 126 of the support member 102 have opposed helical surface portions 128 which are spaced from each other axially, and define a gap 130 axially between the opposed helical surface portions 128. The gap 130 likewise extends over the outer surface 106 of the foil sheet 10C, circumferentially entirely around the axis 66 in a plurality of helical turns. As shown more fully in FIG. 3, the gap 130 is open and free of obstructions axially across its width and circumferentially along its entire length. The width of the gap 130 can be varied, and is preferred to be substantially greater than the width of any of the openings in the underlying layers 92 and 98 of wire mesh screen in the filter 90.

The support member 102 is preferably wrapped in tension around the foil sheet 100 and the underlying filter 90 so as to apply a radially directed compressive force through the sheet 100 and against the underlying filter layers 92–98. The radially directed compressive force applied to the filter layers 92–98 by the support member 102 presses the filter layers 92–98 together to eliminate any voids between adjoining layers. The support member 102 thus presses the filter layers 92–98 into an overlying relationship which is substantially uniform axially and circumferentially throughout the filter 90.

As shown in FIG. 4, the first end cap 62 has a circular inner side surface 140 and a circular outer side surface 142, both of which are centered on the axis 66. The first end cap 62 also has a cylindrical peripheral surface 144 and a cylindrical central surface 146 centered on the axis 66. The central surface 146 extends axially from the inner side surface 140, and is threaded to engage a threaded end surface 148 of the shaft 68.

Other inner surfaces of the first end cap 62 define a an annular recess 150 which also is centered on the axis 66 and which also extends axially from the inner side surface 140. A first sealing ring 152 is located at the inner end of the recess 150. A first end portion 154 of the tubular part 60 of the inflator 14 is received in the recess 150 in abutting contact with the first sealing ring 152. The first end cap 62 could be chamfered at the open end of the recess 150 to facilitate insertion of the end portion 154 into the recess 150.

Additional inner surfaces of the first end cap 62 define an igniter compartment 156. The igniter compartment 156 extends axially through the first end cap 62 between the inner and outer side surfaces 140 and 142 at a location spaced radially from the central surface 146. An igniter 158, which is preferably a squib of known construction, is received closely within the igniter compartment 156. The igniter 158 has a cylindrical casing 160 with an end wall 162 facing axially toward the combustion chamber 78 from the inner side surface 140 of the end cap 62. The igniter 158 further has a pair of electrical lead wires 164 extending axially outward beyond the outer side surface 142 of the end cap 62. The casing 160 contains a pyrotechnic charge which is ignited upon the passage of electric current through the igniter 158 between the lead wires 164. The pyrotechnic charge in the igniter 158 may have any suitable composition known in the art.

The first end cap 62 further has inner surfaces defining another compartment 166 which is open at the inner side surface 140. The compartment 166 contains an auto-ignition material 168 which ignites when the ambient temperature adjacent the inflator 14 reaches a predetermined elevated level. When the auto-ignition material 168 ignites, it emits products of combustion which move into contact with the ignitable gas generating material 70 in the combustion chamber 78 to ignite the gas generating material 70. The auto-ignition material 168 also may have any suitable composition known in the art.

The second end cap 64 similarly has circular inner and outer side surfaces 170 and 172, a cylindrical peripheral surface 174, and a cylindrical central surface 176, each of which is centered on the axis 66. The central surface 176 extends through the second end cap 64 between the inner and outer side surfaces 170 and 172, and thus defines a central passage 178 through which the shaft 68 extends. The second end cap 64 also could have a compartment containing an auto-ignition material, as described above with reference to the first end cap 62.

Other inner surfaces of the second end cap 64 define a an annular recess 180. The recess 180 is shaped to receive a second sealing ring 182 and the second end portion 184 of the tubular part 60 of the inflator 14. The second end cap 64 also could be chamfered to facilitate insertion of the second end portion 184 into the recess 180. However, before the second end portion 184 is moved into the recess 180, a plurality of separate ring shaped pieces 186 of the gas generating material 70 are moved axially over the shaft 68 and into the combustion chamber 78 within the tubular part 60. An optional compression pad 188, which also is shaped as a ring, is preferably moved axially over the shaft 68 before the second end portion 184 of the tubular part 60 is inserted in the recess 180 as shown in FIG. 4. The nut 69 is then screwed onto a threaded end surface 190 of the shaft 68, and is tightened firmly against the outer side surface 172 of the second end cap 64. The first and second end portions 154 and 184 of the tubular part 60 are thus secured in the recesses 150 and 180 in firm abutting contact with the first and second sealing rings 152 and 182, respectively. The compression pad 188 protects the pieces 186 of the gas generating material 70 from breaking upon tightening of the nut 69. Also, when the gas generating material 70 is ignited, it expands. The compression pad 188 allows for expansion of the gas generating material 70 so that the gas generating material 70 does not expand into the filter 90. The compression pad 188 also allows for some relative movement of the ring shaped pieces 186 of the gas generating material 70 to facilitate gas flow between the ring shaped pieces 186. Alternatively, a spring or other structure which performs this function could be used in place of the compression pad 188. Also, an alternative fastener, such as a one-way lock nut or the like, could be used in place of the nut 69 shown in the drawings.

The inflator 14 is installed in the inner compartment 36 in the reaction canister structure 16, as shown in FIGS. 1 and 2. A plurality of arcuately shaped support members 192, or any suitable alternative structures, support the inflator 14 in the inner compartment 36. In the preferred embodiment of the invention shown in the drawings, the inflator 14 is supported in a position in which the peripheral surface of the tubular part 60 is spaced from the inner surface 34 of the inner housing wall portion 30 around the entire circumference of the tubular part 60.

As shown schematically in FIG. 1, the vehicle occupant restraint apparatus 10 further includes an electrical circuit 200. The electrical circuit 200 includes a power source 202, which is preferably the vehicle battery or a capacitor, and a normally open switch 204. The switch 204 is preferably part of a deceleration sensor 206. The deceleration sensor 206 senses the occurrence of a predetermined amount of vehicle deceleration indicative of a collision, and closes the switch 204 upon sensing the occurrence of such deceleration. The electrical circuit 200 also includes the igniter 158 in the inflator 14 (FIG. 4). Electric current passes between the lead wires 164 in the igniter 158 to ignite the pyrotechnic charge in the igniter 158 when the switch 204 is closed.

When the pyrotechnic charge in the igniter 158 is ignited, it produces combustion products which rupture the end wall 162 of the casing 160. The combustion products produced by the burning pyrotechnic charge then emerge from the casing 160 and move into contact with the gas generating material 70 in the combustion chamber 78 to ignite the gas generating material 70. As shown in FIG. 4, the separate ring shaped pieces 186 of the gas generating material 70 have inner surfaces that define passages 210. The passages 210 provide increased surface area for fast burning of the gas generating material 70. As the gas generating material 70 burns in the combustion chamber 78, it produces combustion products including heat, hot particles and a large volume of gas.

The gas generated by the gas generating material 70 in the combustion chamber 78 flows radially outward through the gas flow openings 82 (FIG. 5) in the inner body wall 72 of the tubular part 60 of the inflator 14. The gas further flows radially outward through the filter 90, which removes particles from the gas.

The gas is at first confined within the filter 90 by the foil sheet 100. The support member 102 constrains the filter 90 from deflecting radially outward under the influence of the increasing pressure of the gas which is blocked by the foil sheet 100. When the pressure of the gas reaches a predetermined elevated level, the foil sheet 100 ruptures to release the gas to flow radially outward from the filter 90 through the gap 130.

When the foil sheet 100 ruptures, it bursts radially outward between the helical sections 126 of the support member 102 which define the gap 130. Because the gap 130 is continuously open and free of obstructions axially across its width and circumferentially along its length, the gap 130 provides clearance for the foil sheet 100 to burst radially outward around the entire circumference of the filter 90. The foil sheet 100 is not expected to burst at once around the entire circumference of the filter 90, but instead is expected to burst progressively and/or simultaneously at a plurality of locations that are spaced from each other around and along the filter 90. The open gap 130 permits the foil sheet 100 to burst radially outward at any number of such locations. Accordingly, the support member 102 does not limit the number or the extent of the circumferentially spaced locations at which the foil sheet 100 can release the gas to flow radially outward. As a result, the gas can flow radially outward from the filter 90 and past the support member 102 at any number of locations around the, entire circumference of the filter 90, and is not concentrated at predefined, circumferentially distinct portions of the filter 90. Moreover, because the peripheral surface of the tubular part 60 is spaced from the inner surface 34 of the inner housing wall portion 30, as shown in FIG. 1, the gas can flow into the gas flow space 45 in the reaction canister structure 16 circumferentially entirely around the tubular part 60. The gas then flows from the inflator 14 to the air bag 12 along the flow path extending through the sealing sheet 52 and the openings 50 in the retainer plate 46.

Figure 6:
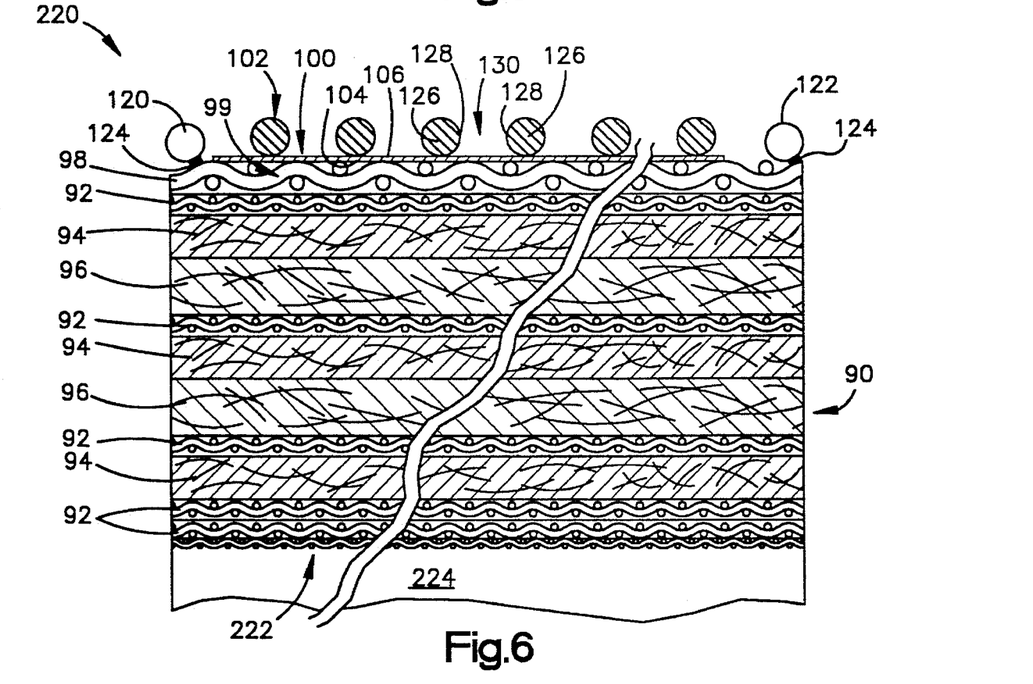
FIG. 6 is a schematic view of parts of a vehicle occupant restraint apparatus comprising a second embodiment of the present invention.

As described above with reference to FIG. 5, the inflator 14 in the first embodiment of the present invention has a tubular part 60 with a tubular inner body wall 72. In a second embodiment of the present invention, the inflator 14 has a tubular part 220 in place of the tubular part 60, as shown in FIG. 6. The tubular part 220 does not have a tubular inner body wall. Instead, the tubular part 220 has a cylindrical inner screen layer 222 which defines a cylindrical combustion chamber 224. The tubular part 220 is otherwise the same as the tubular part 60 described above, as indicated by the same reference numbers used in FIGS. 5 and 6.

Figure 7:
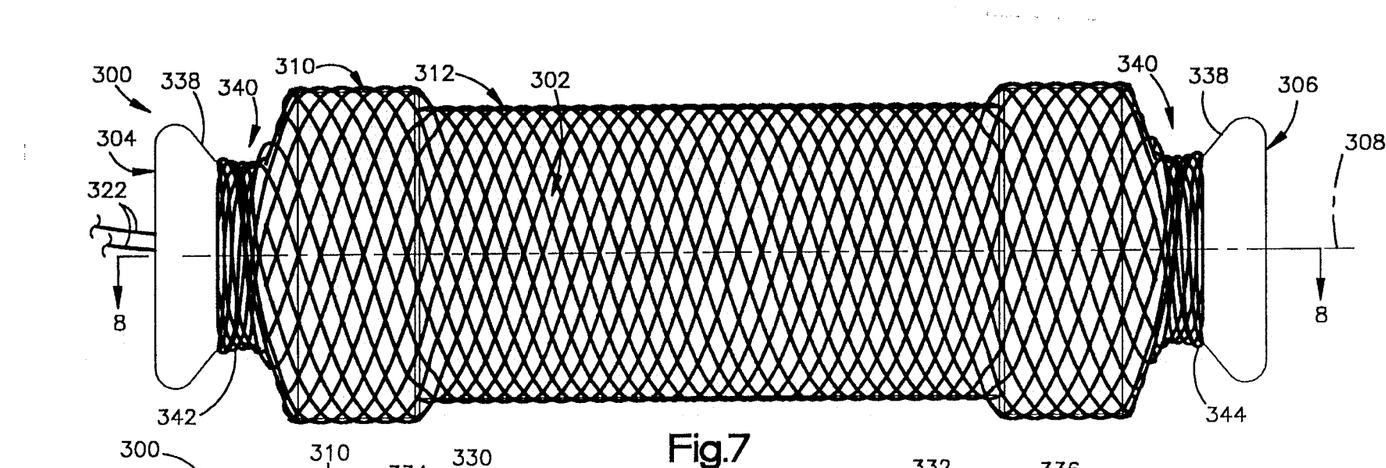
FIG. 7 is a schematic view of parts of a vehicle occupant restraint apparatus comprising a third embodiment of the present invention.
Figure 8:
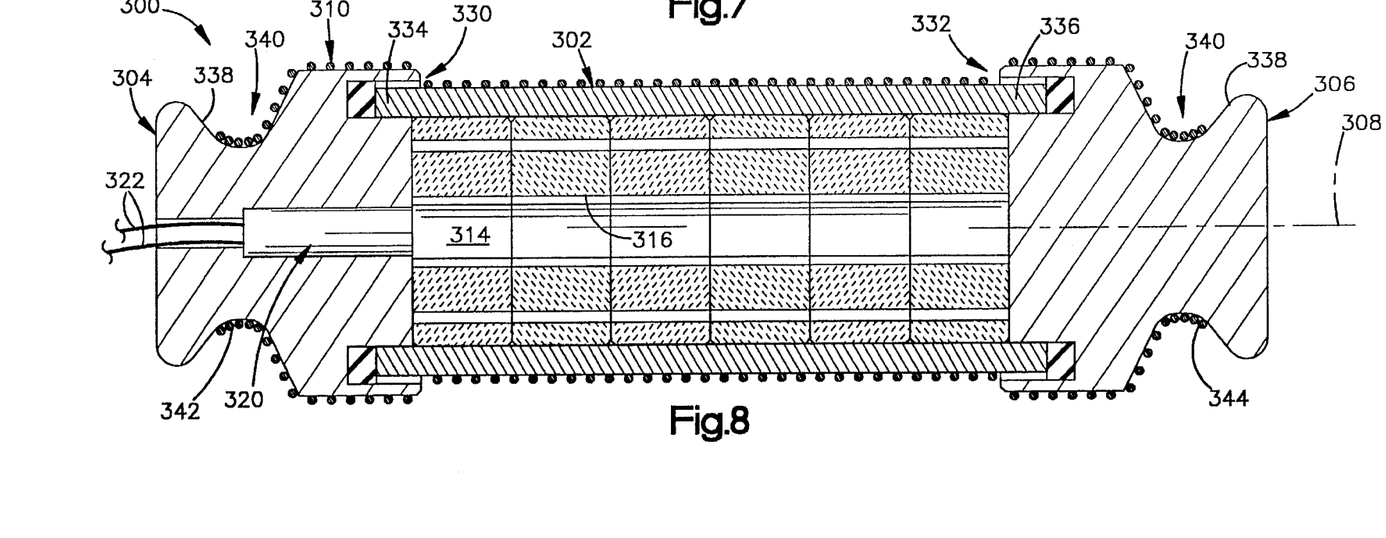
FIG. 8 is a view taken on line 8—8 of FIG. 7.

In a third embodiment of the present invention, the vehicle occupant restraint apparatus 10 includes an inflator 300 in place of the inflator 14 described above. As shown in FIGS. 7 and 8, the inflator 300 has a generally cylindrical shape defined by a tubular part 302, a first end cap 304, and a second end cap 306, each of which is centered on the longitudinal central axis 308 of the inflator 300. The inflator 300 further includes a braided wire sleeve structure 310 with openings 312. The braided wire sleeve structure 310 extends over the tubular part 302 and the end caps 304 and 306 as a circumferentially endless, generally cylindrical layer of metal wire. When the inflator 300 is installed in the reaction canister structure 16 of FIG. 1 in place of the inflator 14, the peripheral surface of the inflator 300 between the end caps 304 and 306 is spaced from the inner housing wall surface 34.

The tubular part 302 of the inflator 300 differs from the tubular parts 60 and 220, as described above with reference to FIGS. 5 and 6, in that the tubular part 302 does not have a support member like the support member 102. However, the tubular part 302 is otherwise substantially the same as the tubular part 60 or, alternatively, the tubular part 220. The tubular part 302 thus defines a cylindrical combustion chamber 314 centered on the axis 308.

An ignitable gas generating material 316, which may have any suitable composition known in the art, is contained in the combustion chamber 314. When the gas generating material 316 is ignited, it rapidly generates a large volume of gas for inflating the air bag 12 (FIG. 1). The gas generated by the gas generating material 316 flows radially outward from the combustion chamber 314 through the tubular part 302, through the openings 312 in the braided wire sleeve structure 310, and further from the inflator 300 to the air bag 12 through the gas flow space 45 in the reaction canister structure 16.

The first end cap 304 in the inflator 300 supports an igniter 320 in a position centered on the axis 308. The igniter 320, like the igniter 158 described above, is included in the electrical circuit 200 and emits products of combustion for igniting the gas generating material 316 upon the passage of electric current between a pair of lead wires 322 in the igniter 320.

The first and second end caps 304 and 306 in the inflator 300 have annular recesses 330 and 332, respectively, which receive opposite ends 334 and 336 of the tubular part 302 in the same manner as described above with reference to the end caps 62 and 64 in the first embodiment of the invention. However, the end caps 304 and 306 differ from the end caps 62 and 64 in that each of the end caps 304 and 306 has an outer peripheral surface 338 which defines a circumferentially extending recess 340.

The braided wire sleeve structure 310 extends axially between the recesses 340 in the end caps 304 and 306. As shown fully in FIG. 7, a first tie wire 342 is wrapped and secured, such as by welding, around the end of the braided wire sleeve structure 310 in the recess 340 in the first end cap 304. A second tie wire 344 is similarly wrapped and secured around the other end of the braided wire sleeve structure 310 in the recess 340 in the second end cap 306. The tie wires 342 and 344 secure the braided wire sleeve structure 310 in place as shown in FIGS. 7 and 8. The braided wire sleeve structure 310 and the tie wires 342 and 344 thus hold the parts 302, 304 and 306 of the inflator 300 together without the need for the threaded shaft 68 and nut 69 of the inflator 14. The braided wire sleeve structure 310 also supports the tubular part 302 in a cylindrical shape in the same manner that the support member 102 supports the tubular part 60 in a cylindrical shape, as described above.

Figure 9:
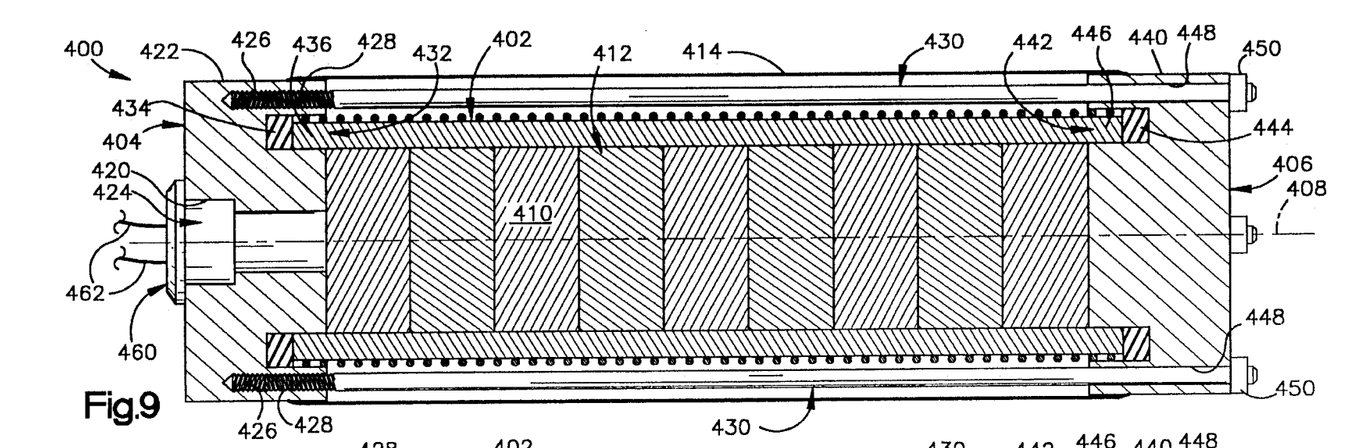
FIG. 9 is a schematic view of parts of a vehicle occupant restraint apparatus comprising a fourth embodiment of the present invention.

In a fourth embodiment of the present invention, the vehicle occupant restraint apparatus 10 includes an inflator 400, which is shown in FIG. 9. Like the inflators 14 and 300 described above, the inflator 400 has a generally cylindrical shape defined by a tubular part 402, a first end cap 404, and a second end cap 406, each of which is centered on a longitudinal central axis 408.

The tubular part 402 is substantially the same as the tubular part 60 or, alternatively, the tubular part 220 described above. Accordingly, the tubular part 402 defines a cylindrical combustion chamber 410 which also is centered on the axis 408. An ignitable gas generating material 412, which may have any suitable composition known in the art, is contained in the combustion chamber 410.

The inflator 400 further includes a sheet 414 of hermetic sealing material. The sealing sheet 414 extends circumferentially and axially over the tubular part 402 between the end caps 404 and 406, and thus provides a hermetic seal which protects the gas generating material 412 inside the tubular part 402. The sealing sheet 414 is preferably formed of plastic, aluminized mylar, metal foil, or any other material suitable for providing a hermetic seal.

The first end cap 404 has cylindrical central surface 420 and a cylindrical peripheral surface 422. One end of the sealing sheet 414 extends partly over the peripheral surface 422, and is fixed to the peripheral surface 422 by an adhesive or other suitable means. The central surface 420 defines an igniter compartment 424.

The first end cap 404 further has four threaded inner surfaces 426, two of which are shown in FIG. 9. The threaded inner surfaces 426 are spaced circumferentially from each other 90° or at some other suitable angle about the axis 408. Each of the threaded inner surfaces 426 engages a threaded end surface 428 on a respective one of four individual connecting shafts 430.

Other inner surfaces of the first end cap 404 define an annular recess 432. A first sealing ring 434 and a first end portion 436 of the tubular part 402 are closely received in the recess 432. The first end cap 404 could be chamfered at the open end of the recess 432 to facilitate insertion of the first end portion 436 into the recess 432.

The second end cap 406 has a cylindrical peripheral surface 440 upon which the other end of the sealing sheet 414 is fixed by an adhesive. The second end cap 406 also has inner surfaces which define an annular recess 442. The recess 442 contains a second sealing ring 444 and the second end portion 446 of the tubular part 402. The second end cap 406 also could be chamfered to facilitate insertion of the second end portion 446 into the recess 442.

The second end cap 406 further has four unthreaded inner surfaces 448, each of which defines a passage extending axially through the second end cap 406. The unthreaded inner surfaces 448 are spaced circumferentially from each other about the axis 408, and are aligned with the threaded inner surfaces 426 in the first end cap 404. Each of the connecting shafts 430 extends through a respective one of the passages defined by the inner surfaces 448, and receives a fastener 450 on its outer end portion. The connecting shafts 430 and the fasteners 450 thus hold the tubular part 402 and the end caps 404 and 406 securely together in the assembled positions shown in FIG. 9.

The fasteners 450 are preferably one-way lock nuts, but other suitable fasteners could be used as alternatives. Additionally, either or both of the end caps 404 and 406 could support an auto-ignition material, as described above with reference to FIG. 4. One or more compressible structures like the compression pad 188 of FIG. 4 also could be included in the inflator 400.

An igniter 460 is supported in the igniter compartment 424 in the first end cap 404. The igniter 460 is thus supported in a position to direct combustion products into the combustion chamber 410 to ignite the gas generating material 412 when the igniter 460 is actuated. The igniter 460 is a conventional squib which is actuated upon the passage of electric current between a pair of lead wires 462.

The inflator 400 is installed in the vehicle occupant restraint apparatus 10 of FIG. 1 in place of the inflator 14. The sealing sheet 414 is preferably spaced from the inner housing wall surface 34 when the inflator 400 is thus installed in the reaction canister structure 16. The igniter 460, which is included in the electrical circuit 200, is actuated when the switch 204 in the deceleration sensor 206 closes. The gas generating material. 412 in the combustion chamber 410 is then ignited by the igniter 460, and rapidly generates a large volume of gas which flows radially outward from the combustion chamber 410 through the tubular part 402 of the inflator 400. When the gas emerges from the tubular part 402, it destroys the sealing sheet 414 and flows freely outward into the gas flow space 45 circumferentially entirely around the tubular part 402. The gas then flows from the inflator 400 to the air bag 12 along the flow path extending through the openings 50 in the retainer plate 46. Because the sealing sheet 414 is included in the inflator 400, the sealing sheet 52 of FIGS. 1 and 2 can be omitted from the embodiment of the invention which includes the inflator 400.

Figure 10:
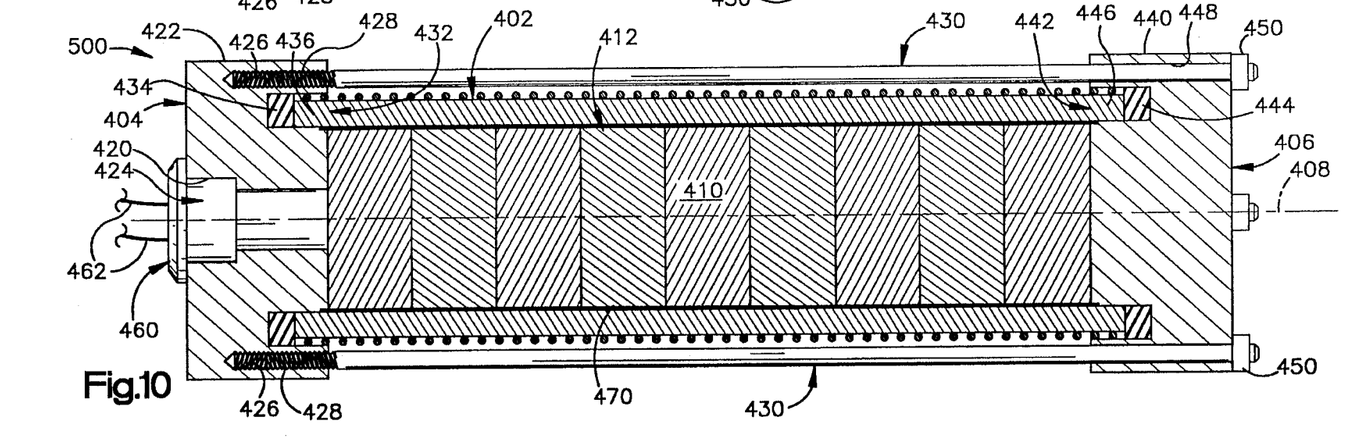
FIG. 10 is a schematic view of parts of a vehicle occupant restraint apparatus comprising a fifth embodiment of the present invention.

A fifth embodiment of the present invention includes an inflator 500, which is shown in FIG. 10. The inflator 500 includes an alternative sheet 470 of hermetic sealing material instead of the sheet 414, but is otherwise the same as the inflator 400 described above, as indicated by the same reference numbers used in FIGS. 9 and 10. Rather than extending circumferentially and axially over the tubular part 402 between the end caps 404 and 406, the sealing sheet 470 extends circumferentially and axially over the gas generating material 412 between the gas generating material 412 and the surrounding tubular part 402. The sealing sheet 470 is formed of plastic, aluminized mylar, metal foil or any other material suitable for providing a hermetic seal which protects the gas generating material 412.

Figure 11:
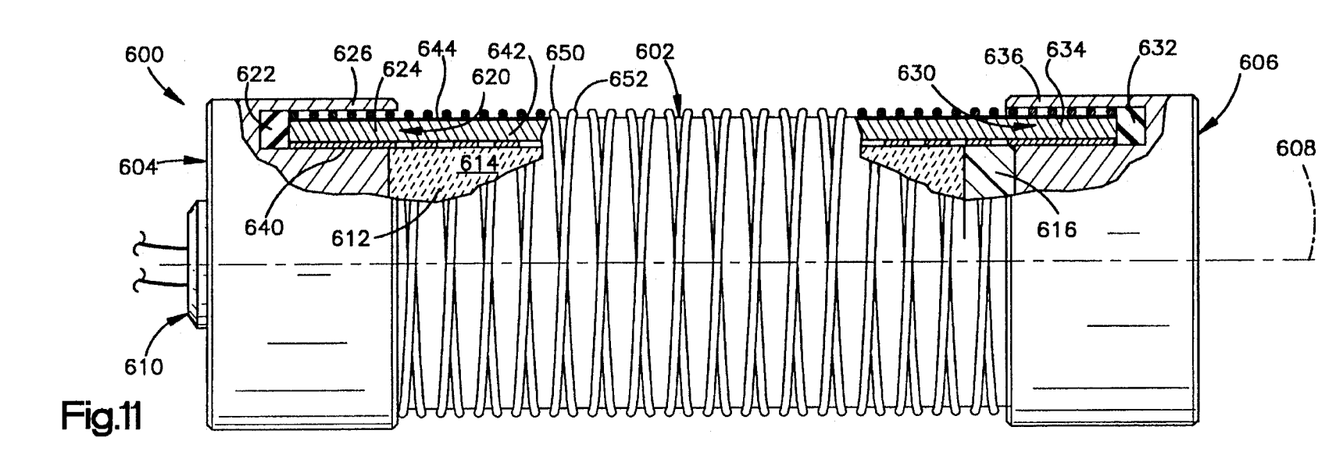
FIG. 11 is a schematic view of parts of a vehicle occupant restraint apparatus comprising a sixth embodiment of the present invention.

In a sixth embodiment of the present invention, the vehicle occupant restraint apparatus 10 includes an inflator 600, which is shown in FIG. 11. The inflator 600 has a generally cylindrical shape defined by a tubular part 602 and a pair of end caps 604 and 606 which are centered on a longitudinal central axis 608. The inflator 600 also includes an igniter 610, an ignitable gas generating material 612 in a combustion chamber 614, and an optional compression pad 616, each of which is substantially the same as the corresponding parts of the alternative inflators described above.

The first end cap 604 has inner surfaces defining an annular recess 620. A first sealing ring 622 and a first end portion 624 of the tubular part 602 are received closely within the recess 620. Like the end caps described above, the first end cap 604 may be chamfered at the open end of the recess 620 to facilitate insertion of the first end portion 624 of the tubular part 602. The first end cap 604 further has an annular peripheral portion 626 which surrounds the recess 620. The annular peripheral portion 626 of the first end cap 604 is crimped radially inward to hold the first end portion 624 of the tubular part 602 securely in the recess 620.

The second end cap 606 similarly has inner surfaces defining an annular recess 630 which contains a second sealing ring 632 and the second end portion 634 of the tubular part 602, and also may be chamfered as described above. An annular peripheral portion 636 of the second end cap 606 is crimped radially inward to hold the second end portion 634 securely in the recess 630. The tubular part 602, the first end cap 604, and the second end cap 606 are thus fastened together in the assembled positions of FIG. 11 without the need for the connecting shafts and fasteners described above with reference to the inflators 14, 400 and 500.

The tubular part 602 has a tubular inner body wall 640, and includes a generally cylindrical tubular filter 642 extending circumferentially around the inner body wall 640. The inner body wall 640 and the filter 642 are preferred to be substantially the same as the inner body wall 72 and the filter 90 shown in FIG. 5. Alternatively, the inner body wall 640 could be replaced by a cylindrical inner screen layer like the layer 222 shown in FIG. 6. A sheet 644 of rupturable pressure controlling material, which is preferably formed of aluminum foil, extends circumferentially and axially over the filter 1542. A sheet of hermetic sealing material also could be included to protect the gas generating material 612 inside the tubular part 602. Such a sealing sheet would preferably be substantially the same as either of the sealing sheets 414 and 470 described above.

The tubular part 602 further includes first and second support members 650 and 652. The first support member 650 is a strand of metal wire which extends circumferentially and axially over the foil sheet 644 in a helical configuration. The first support member 650 is thus wrapped around the foil sheet 644 and the filter 642 in the manner described above with reference to the support member 102, which is shown in FIGS. 3–6. The second support member 652 similarly extends circumferentially and axially over the foil sheet 642 and the filter 642 in a helical configuration. The two support members thus define a generally cylindrical, circumferentially endless layer of metal wire extending over the foil sheet 644 and the filter 642.

The angle at which the second support member 652 extends transversely to the axis 608 is equal and opposite to the angle at which the first support member 650 extends transversely to the axis 608. The helical sections of the two support members 650 and 652 which extend axially from left to right, as viewed in FIG. 11, thus extend circumferentially around the axis 608 in opposite directions. Therefore, the helical sections of the two support members 650 and 652 intersect each other at a plurality of locations. The second support member 652 crosses over the first support member 650 at each intersection of the two support members 650 and 652.

A number of the intersecting helical sections of the two support members 650 and 652 are located inside the recesses 620 and 630 in the end caps 604 and 606. Those helical sections are frictionally engaged by the crimped peripheral portions 626 and 636 of the end caps 604 and 606. Those helical sections thus resist movement of the end caps 604 and 606 axially outward under the influence of the gas pressure in the combustion chamber 614. Because the helical sections of the support members 650 and 652 cross each other in opposite circumferential directions, each support member prevents the other from functioning as a screw thread which could guide the end caps 604 and 606 to rotate and move axially outward from the tubular part 602.

Figure 12:
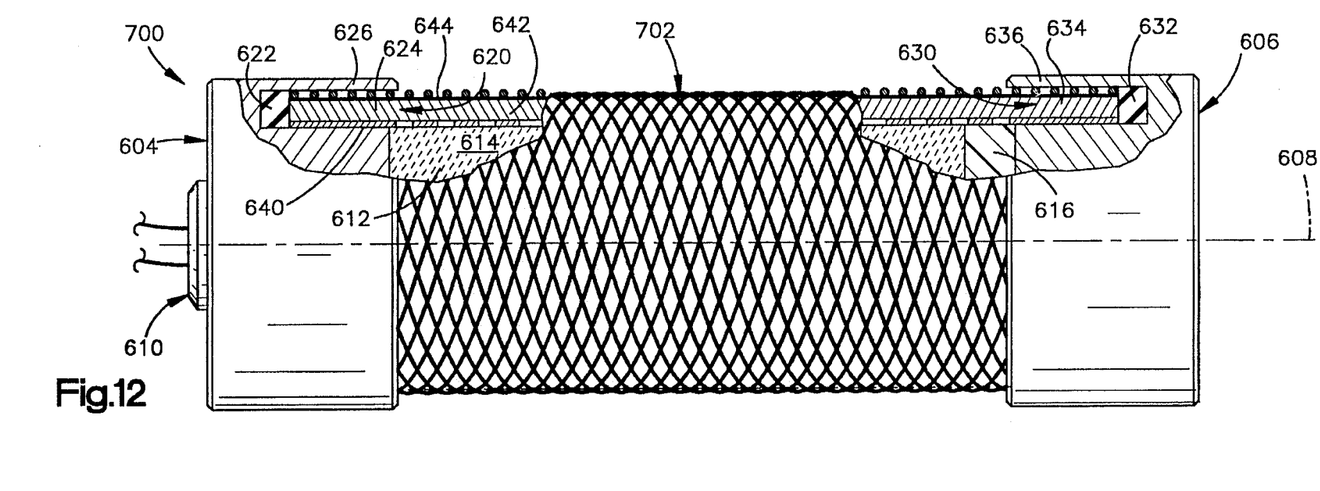
FIG. 12 is a schematic view of parts of a vehicle occupant restraint apparatus comprising a seventh embodiment of the present invention.

A seventh embodiment of the present invention includes an inflator 700, which is shown in FIG. 12. The inflator 700 is similar to the inflator 600 shown in FIG. 11, as indicated by the same reference numbers used in FIGS. 11 and 12. The inflator 700 differs from the inflator 600 in that the inflator 700 does not include support members like the support members 650 and 652. Instead, the inflator 700 includes a braided wire sleeve structure 702.

The braided wire sleeve structure 702 extends over the foil sheet 644 between the opposite end portions 624 and 634 of the tubular part 602 as a circumferentially endless, generally cylindrical layer of metal wire. The braided wire sleeve structure 702 is thus similar to the braided wire sleeve structure 310 shown in FIGS. 7 and 8, but extends into the recesses 620 and 630 in the end caps 604 and 606 rather than over the peripheral outer surfaces of the end caps 604 and 606.

When the inflator 700 is actuated, the braided wire sleeve structure 702 constrains the filter 642 from deflecting out of its generally cylindrical tubular shape under the influence of the gas flowing radially outward through the tubular part 602. Additionally, the portions of the interwoven strands of the braided wire sleeve structure 702 that extend into the recesses 620 and 630 are frictionally engaged by the crimped peripheral portions 626 and 636 of the end caps 604 and 606. Those portions of the interwoven strands thus resist movement of the end caps 604 and 606 axially outward under the influence of the gas pressure in the combustion chamber 614. In this respect, the interwoven strands of the braided wire sleeve structure 702 are similar to the nonwoven, overlapping support members 650 and 652 shown in FIG. 11, because the interwoven strands also cross each other in opposite circumferential directions. The interwoven strands thus prevent each other from functioning as a screw thread which could guide the end caps 604 and 606 to rotate and move axially outward from the tubular part 602.

Figure 13:
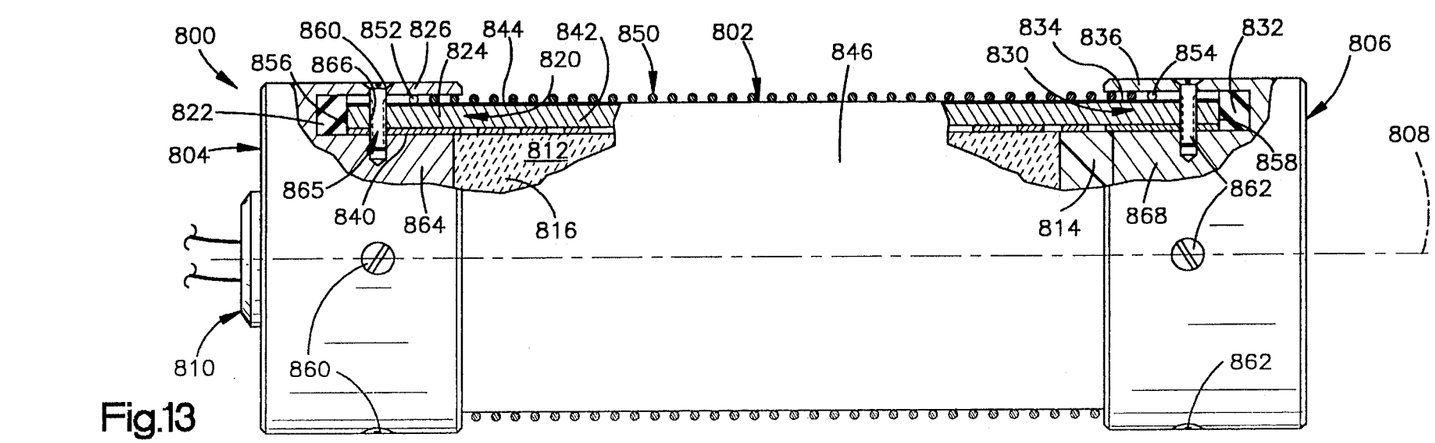
FIG. 13 is a schematic view of parts of a vehicle occupant restraint apparatus comprising an eighth embodiment of the present invention.

In an eighth embodiment of the present invention, the vehicle occupant restraint apparatus 10 includes an inflator 800, which is shown in FIG. 13. The inflator 800 has a generally cylindrical shape defined by a tubular part 802 and a pair of end caps 804 and 806 which are centered on a longitudinal central axis 808. The inflator 800 also includes an igniter 810, a combustion chamber 812, and an optional compression pad 814, all of which are substantially the same as the corresponding parts of the alternative inflators 600 and 700 described above. An ignitable gas generating material 816, which may have any suitable composition known in the art, is contained in the combustion chamber 812.

The first end cap 804 has inner surfaces defining an annular recess 820. A first sealing ring 822 and a first end portion 824 of the tubular part 802 are received closely within the recess 820. Like the end caps described above, the first end cap 804 may be chamfered at the open end of the recess 820 to facilitate insertion of the first end portion 824 of the tubular part 802. The first end cap 804 further has an annular peripheral part 826 which surrounds the recess 820. The annular peripheral part 826 of the first end cap 804 thus overlaps the first end portion 824 of the tubular part 802 axially and circumferentially.

The second end cap 806 similarly has inner surfaces defining an annular recess 830 which contains a second sealing ring 832 and the second end portion 834 of the tubular part 802, and also may be chamfered as described above. An annular peripheral part 836 of the second end cap 806 surrounds the recess 830 and thus overlaps the second end portion 834 of the tubular part 802 axially and circumferentially.

The tubular part 802 has a tubular inner body wall 840, and includes a generally cylindrical tubular filter 842 extending circumferentially around the inner body wall 840. The filter 842 has a cylindrical outer surface portion 844 extending axially between the end caps 804 and 806. The inner body wall 840 and the filter 842 are preferred to be substantially the same as the inner body wall 72 and the filter 90 shown in FIG. 5. Alternatively, the inner body wall 840 could be replaced by a cylindrical inner screen layer like the layer 222 shown in FIG. 6. A sheet 846 of rupturable pressure controlling material, which is preferably formed of aluminum foil, extends circumferentially and axially over the filter 842. A sheet of hermetic sealing material also could be included to protect the gas generating material 816 inside the tubular part 802. Such a sealing sheet would preferably be substantially the same as either of the sealing sheets 414 and 470 described above.

The tubular part 802 further includes a support structure 850. The support structure 850 comprises a generally cylindrical, circumferentially endless layer of metal wire extending over the foil sheet 846 and the filter 842. The support structure 850 functions to constrain the filter 842 from being deflected out of its generally cylindrical shape by the pressure of the gas that flows radially outward through the filter 842 when the inflator 800 is actuated. Accordingly, the support structure 850 may be constructed like any of the corresponding support structures shown in FIGS. 2–6 and 9–12. However, in the preferred form of the inflator 800, the support structure 850 differs from those shown in FIGS. 2–6 and 9–12 in that the opposite ends 852 and 854 of the support structure 850 are spaced substantial distances axially inward from the opposite ends 856 and 858 of the tubular part 802, respectively. Alternatively, a support structure like the one shown in FIGS. 7 and 8 could be used in the inflator 800 in place of the support structure 850.

As further shown in FIG. 13, the inflator 800 includes a plurality of first fasteners 860 and a plurality of second fasteners 862. The first fasteners 860 fasten the first end cap 804 directly to the first end portion 824 of the tubular part 802. The second fasteners 862 fasten the second end cap 806 directly to the second end portion 834 of the tubular part 802.

The first fasteners 860 penetrate the tubular part 802. Specifically, each of the first fasteners 860 extends radially through the first end portion 824 of the tubular part 802 from the annular peripheral part 826 of the first end cap 804 to a cylindrical central part 864 of the first end cap 804. The first fasteners 860 thus extend radially through passages 865 in the tubular part 802. The passages 865 could be preformed, or could be formed by the first fasteners 860 when they are screwed or otherwise driven radially through the tubular part 802. In either case, the tubular part 802 has a respective inner surface portion 866 in each of the passages 865 through which the first fasteners 860 extend. The inner surface portions 866 are spaced axially inward from the first end 856 of the tubular part 802, and extend radially inward from the cylindrical outer surface portion 844 of the filter 842. Importantly, the inner surface portions 866 face axially inward of the first end 856 of the tubular part 802. The inner surface portions 866 thus block movement of the first fasteners 860 and the first end cap 804 axially outward from the first end 856 of the tubular part 802 under the influence of the pressure of the gas generated by the gas generating material 816.

Each of the second fasteners 862 similarly extends radially through the second end portion 834 of the tubular part 802 from the annular peripheral part 836 of the second end cap 806 to a cylindrical inner part 868 of the second end cap 806. As shown in FIG. 13, the first and second fasteners 860 and 862 are preferably located axially outward of the first and second opposite ends 852 and 854 of the support structure 850, respectively. Although the first and second fasteners 860 and 862 are preferred to be screws, any other suitable fasteners known in the art may be used as alternatives.

Figure 14:
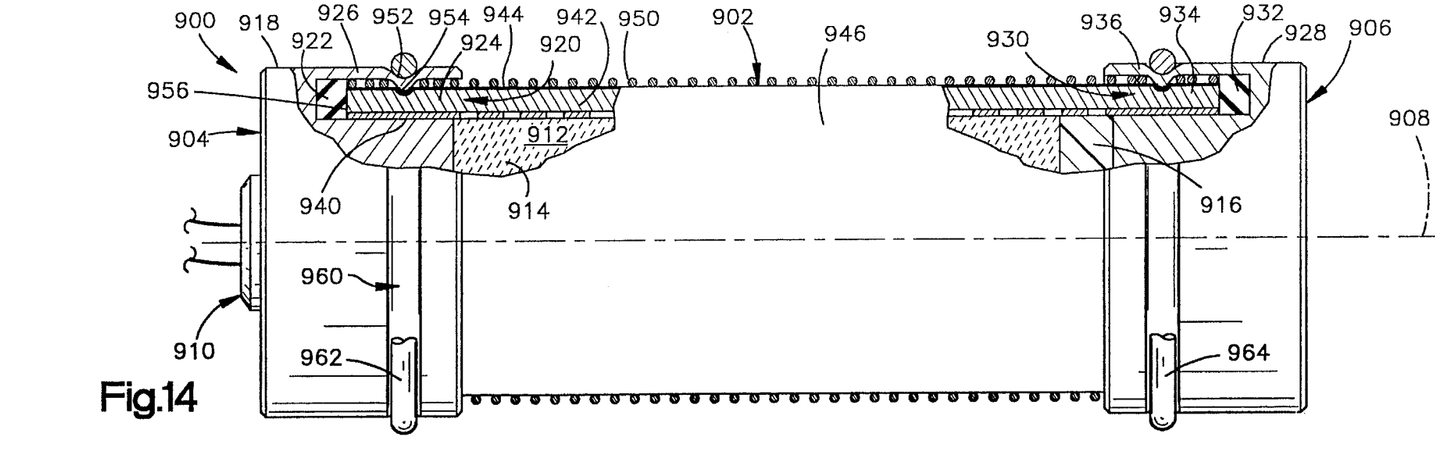
FIG. 14 is a schematic view of parts of a vehicle occupant restraint apparatus comprising a ninth embodiment of the present invention.

In a ninth embodiment of the present invention, the vehicle occupant restraint apparatus 10 includes an inflator 900, which is shown in FIG. 14. The inflator 900 also has a generally cylindrical shape defined by a tubular part 902 and a pair of end caps 904 and 906 which are centered on a longitudinal central axis 908. Like the alternative inflators 600, 700 and 800 described above, the inflator 900 includes an igniter 910, a combustion chamber 912 containing an ignitable gas generating material 914, and an optional compression pad 916.

The first end cap 904 has a cylindrical peripheral surface 918, and further has inner surfaces defining an annular recess 920. A first sealing ring 922 and a first end portion 924 of the tubular part 902 are received closely within the recess 920. Like the end caps described above, the first end cap 904 may be chamfered at the open end of the recess 920 to facilitate insertion of the first end portion 924 of the tubular part 902. The first end cap 904 further has an annular peripheral part 926 which surrounds the recess 920. The annular peripheral part 926 of the first end cap 904 thus overlaps the first end portion 924 of the tubular part 902 axially and circumferentially.

In a similar manner, the second end cap 906 has a cylindrical peripheral surface 928, and further has inner surfaces defining an annular recess 930 which contains a second sealing ring 932 and the second end portion 934 of the tubular part 902. The second end cap 906 also may be chamfered as described above. An annular peripheral part 936 of the second end cap 906 surrounds the recess 930 and thus overlaps the second end portion 934 of the tubular part 902 axially and circumferentially.

The tubular part 902 of the inflator 900 has a tubular inner body wall 940, and includes a generally cylindrical tubular filter 942 extending circumferentially around the inner body wall 940. The filter 942 has a cylindrical outer surface portion 944 extending axially between the end caps 904 and 906. The inner body wall 940 and the filter 942 are preferred to be substantially the same as the inner body wall 72 and the filter 90 shown in FIG. 5. Alternatively, the inner body wall 940 could be replaced by a cylindrical inner screen layer like the layer 222 shown in FIG. 6. A sheet 946 of rupturable pressure controlling material, which is preferably formed of aluminum foil, extends circumferentially and axially over the filter 942. A sheet of hermetic sealing material also could be included to protect the gas generating material 914 inside the tubular part 902. Such a sealing sheet would preferably be substantially the same as either of the sealing sheets 414 and 470 described above.

The tubular part 902 further includes a support structure 950. The support structure 950 comprises a generally cylindrical, circumferentially endless layer of metal wire extending over the foil sheet 946 and the filter 942. The support structure 950 functions to constrain the filter 942 from being deflected out of its generally cylindrical shape by the pressure of the gas that flows radially outward through the filter 942 when the inflator 900 is actuated. Accordingly, the support structure 950 may be constructed like any of the corresponding support structures shown in FIGS. 2–6 and 9–13. Alternatively, a support structure like the one shown in FIGS. 7 and 8 could be used in the inflator 900 in place of the sup]port structure 950.

The peripheral part 926 of the first end cap 904 has a deformed portion 952 which is crimped or swaged radially inward. The deformed portion 952 projects radially inward sufficiently to indent the tubular part 902 so as to form a radially recessed surface portion 954 of the tubular part 902. The recessed surface portion 954 of the tubular part 902 is spaced axially inward from the first end 956 of the tubular part 902, and is radially inward of the cylindrical outer surface portion 944 of the filter 942. Importantly, a portion of the recessed surface portion 954 faces axially inward of the first end 956 of the tubular part 902.

The deformed portion 952 of the first end cap 904 extends radially inward across the recessed surface portion 954 of the tubular part 902. The first end cap 904 is thus connected directly to the tubular part 902 in a configuration in which the deformed portion 952 of the first end cap 904 and the recessed surface portion 954 of the tubular part 902 block movement of the first end cap 904 axially outward under the influence of the pressure of the gas generated by the gas generating material 914.

As further shown in FIG. 14, the deformed portion 952 of the first end cap 904 defines a groove 960 which preferably extends circumferentially entirely around the first end cap 904. A first C-clamp 962, or any suitable alternative clamp structure, is received in the groove 960 and applies a radially compressive clamping force to the first end cap 904 at the peripheral surface 918 in the groove 960. The first C-clamp 962 thus holds the first end cap 904 securely in its deformed condition. The second end cap 906 is likewise crimped or swaged radially inward to hold the second end portion 934 of the tubular part 902 in the recess 930, and is held securely in its deformed condition by a second C-clamp 964.

From the above description of the invention, those skilled in the art will perceive improvements, changes and modifications. For example, although the tubular parts of the inflators in the preferred embodiments of the invention shown in the drawings have cylindrical tubular shapes which have circular cross sections, they could alternatively have non-cylindrical tubular shapes which have non-circular cross sections. Such improvements, changes and modifications within the skill of the art are intended to be covered by the appended claims.

Having described the invention, the following is claimed:

1. Apparatus for inflating an inflatable vehicle occupant restraint, said apparatus comprising:

an ignitable gas generating material which, when ignited, generates gas for inflating the restraint; and a cylindrical inflator having a tubular part with a longitudinal central axis and first and second axially opposite ends, said tubular part including means for defining a combustion chamber containing said gas generating material, said tubular part further including cylindrical filter means for filtering said gas radially outward of said combustion chamber;

said inflator being free of a tubular body wall defining gas flow openings at a location radially outward of said means for defining said combustion chamber;

said inflator further including first and second end caps extending across said first and second ends of said tubular part, respectively, said first and second end caps having fastener means for securing said end caps against movement from said tubular part under the influence of the pressure of said gas, said fastener means directly engaging said tubular part to connect said end caps directly to said tubular part.

2. Apparatus as defined in claim 1 wherein said tubular part has first and second surface portions which face axially inward of said first and second ends of said tubular part, respectively, said fastener means extending radially across said first surface portion of said tubular part to block movement of said first end cap axially outward from said first end of said tubular part, said fastener means extending radially across said second surface portion of said tubular part to block movement of said second end cap axially outward from said second end of said tubular part.

3. Apparatus as defined in claim 2 wherein said filter means has a cylindrical outer surface portion extending axially between said end caps, said first and second surface portions of said tubular part being located radially inward of said cylindrical outer surface portion of said filter means.

4. Apparatus as defined in claim 2 wherein each of said end caps has a part which axially overlaps a respective end portion of said tubular part, said fastener means including fasteners extending radially from said overlapping parts of said end caps into said tubular part.

5. Apparatus as defined in claim 4 wherein said fasteners comprise screws.

6. Apparatus as defined in claim 4 wherein said tubular part further includes support means for surrounding said filter means to constraint said filter means from being deflected out of a cylindrical shape by the pressure of said gas, said support means including a wire structure extending circumferentially and axially over said filter means, said wire structure having axially opposite ends, said fasteners extending radially into said tubular part at locations axially outward of said opposite ends of said wire structure.

7. Apparatus as defined in claim 2 wherein each of said end caps has a part which axially overlaps a respective end portion of said tubular part, said overlapping parts of said first and second end caps having deformed portions extending radially inward across said first and second surface portions of said tubular part, respectively.

8. Apparatus as defined in claim 7 wherein each of said end caps has a cylindrical peripheral surface, said fastener means including a pair of clamps, each of said clamps applying a radially compressive clamping force to a respective one of said cylindrical peripheral surfaces at the deformed portion of the respective end cap.

* * * * *